(12) United States Patent
Wong et al.

(10) Patent No.: US 8,131,860 B1
(45) Date of Patent: Mar. 6, 2012

(54) SERIALIZATION AND DESERIALIZATION

(75) Inventors: Chee Wong, Mountain View, CA (US);
Rajesh Kasanagottu, Fremont, CA (US)

(73) Assignee: EMC Corporation, Hopkinton, MA (US)

( * ) Notice: Subject to any disclaimer, the term of this patent is extended or adjusted under 35 U.S.C. 154(b) by 464 days.

(21) Appl. No.: 11/393,199

(22) Filed: Mar. 30, 2006

(51) Int. Cl.
*G06F 15/16* (2006.01)
*G06F 11/00* (2006.01)
*G06F 12/00* (2006.01)
*H04W 4/00* (2009.01)
*H04L 29/06* (2006.01)

(52) U.S. Cl. ........ 709/228; 709/227; 370/338; 711/162; 713/163; 714/11; 714/13; 714/19

(58) Field of Classification Search .................. None
See application file for complete search history.

(56) References Cited

U.S. PATENT DOCUMENTS

| | | | | |
|---|---|---|---|---|
| 5,163,148 A * | 11/1992 | Walls | ............................. | 711/162 |
| 5,634,052 A * | 5/1997 | Morris | ............................ | 707/640 |
| 5,659,614 A * | 8/1997 | Bailey, III | ..................... | 713/165 |
| 5,778,395 A * | 7/1998 | Whiting et al. | ........................ | 1/1 |
| 5,812,748 A * | 9/1998 | Ohran et al. | ..................... | 714/4.5 |
| 6,154,852 A * | 11/2000 | Amundson et al. | ........... | 714/5.11 |
| 6,377,951 B1 * | 4/2002 | Campbell | .............................. | 1/1 |
| 6,539,494 B1 * | 3/2003 | Abramson et al. | ................. | 714/4 |
| 6,594,781 B1 * | 7/2003 | Komasaka et al. | .............. | 714/19 |
| 6,772,306 B2 * | 8/2004 | Suzuki et al. | .................. | 711/162 |
| 6,934,877 B2 * | 8/2005 | Tamatsu | ........................ | 714/5.11 |
| 6,944,788 B2 * | 9/2005 | Dinker et al. | ................. | 714/4.11 |
| 6,961,870 B2 * | 11/2005 | Chiu et al. | ........................ | 714/11 |
| 6,963,996 B2 * | 11/2005 | Coughlin | ...................... | 714/4.12 |
| 7,089,384 B2 * | 8/2006 | Tross et al. | ..................... | 711/162 |
| 7,165,154 B2 * | 1/2007 | Coombs et al. | ............... | 711/162 |
| 7,225,371 B2 * | 5/2007 | Wolfgang et al. | ............. | 714/710 |
| 7,363,539 B1 * | 4/2008 | Mitrov | ............................. | 714/18 |
| 2003/0217159 A1 * | 11/2003 | Schramm-Apple et al. | .. | 709/228 |
| 2005/0193245 A1 * | 9/2005 | Hayden et al. | ................... | 714/13 |
| 2005/0204045 A1 * | 9/2005 | Belkin et al. | ................... | 709/227 |
| 2005/0246398 A1 * | 11/2005 | Barzilai et al. | ................ | 707/204 |
| 2006/0112149 A1 * | 5/2006 | Kan et al. | ....................... | 707/201 |

FOREIGN PATENT DOCUMENTS

WO PCT/US00/07238 9/2000

* cited by examiner

*Primary Examiner* — Ario Etienne
*Assistant Examiner* — Ho Shiu
(74) *Attorney, Agent, or Firm* — Van Pelt, Yi & James LLP

(57) ABSTRACT

Serialization is disclosed. It is detected if a component included in a graph of components associated with a user session on a first system has not changed since a prior serialization to a second system. A token is sent to the second system during a current serialization, instead of the component, indicating the component has not changed since the prior serialization. De-serialization is disclosed. a token is received at a first system from a second system, in a stream of serialized data from the second system, that indicates that a component on the second system has not changed since a prior serialization. A cached version of the component is retrieved. The cached copy is used to reconstruct on the second system a state of a user session with which the component is associated on the second system.

21 Claims, 5 Drawing Sheets

SERIALIZATION AND DESERIALIZATION

BACKGROUND OF THE INVENTION

For business continuity and user satisfaction, a computer system/service is required to be available for its users at all times. However, computer systems do fail and the computer system/service still needs to be available. One solution is to have a second computer shadow the first computer system by continuously updating its state to match the state of the first computer system. If the first computer system fails (e.g., crashes) and this is detected, then the user can be switched to the second system and operate as if still connected to the first computer. A problem with this solution is that as the number of users and sessions grows, more and more communication is required in order for the second computer to match its state to that of the first computer. It would be beneficial for a system to be able to match states between a first system and a second system especially as the number of users and sessions increase.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Efficient serialization and de-serialization is disclosed. It is detected if a component has not changed since a prior serialization. A user session state is comprised of one or more components on a primary application server. A prior serialization created a copy of the user session state on a secondary application server. A token is sent during a current serialization instead of the component that has not changed. At the receiving (secondary or backup) end, a token is received that indicates that a component has not changed since a prior serialization. A version of the component cached previously on the secondary system is retrieved and used to update on the secondary system a copy of a session state on the primary application server. In some embodiments, only components that have been modified since the last serialization are serialized from a primary system to a secondary system; otherwise a token indicating to the secondary system that it should use the previously serialized version of the component is inserted into the serialization stream.

Figure 1:
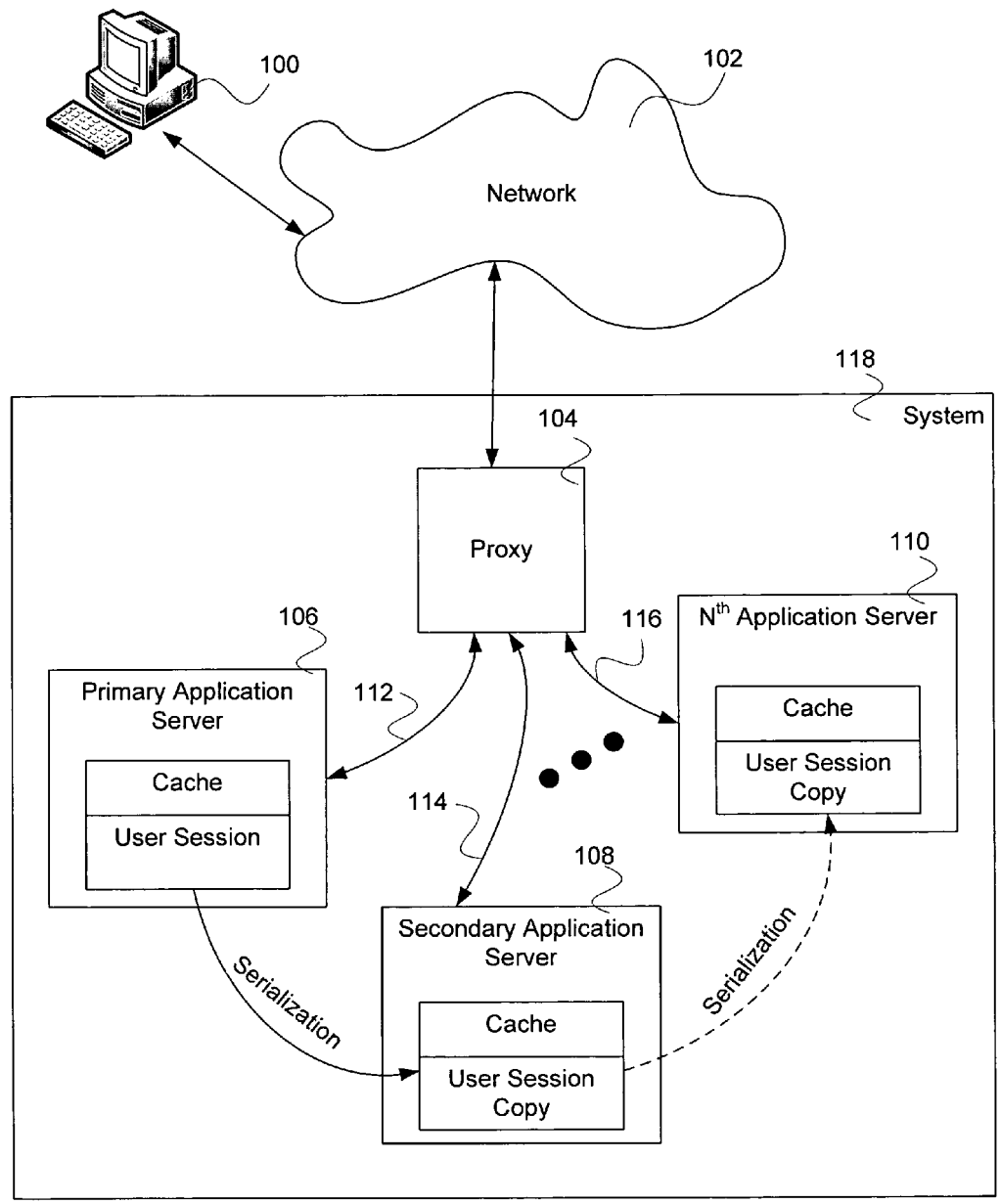
FIG. 1 is a block diagram illustrating an embodiment of a system for serialization.

FIG. 1 is a block diagram illustrating an embodiment of a system for serialization. In the example shown, a computer or terminal, such as one of those represented in FIG. 1 by the computer 100, is used to interact with system 118, which provides access and/or services to one or more users—for example, a content management system. Computer 100 is coupled to network 102 and interacts via network 102 with proxy 104 of system 118. In various embodiments, network 102 includes one or more of the Internet, a local area network, a wide area network, a wired network, a wireless network, and any other network that can enable a user to interact with system 118. Proxy 104 monitors interactions between users and primary application server 106. In the event that primary application server 106 becomes unavailable to interact with users, proxy 104 switches users to interact with secondary application server 108 in a manner that attempts to be automatic and such that it is not apparent to the users, e.g., without loss of data or state and without requiring the user to reconnect or start over. In the event that secondary application server 108 becomes unavailable, in the example shown proxy 104 can switch users to interact with another standby server, such as $N^{th}$ application server 110 or primary application server 106, as appropriate or as desired. In some embodiments, users interact with a plurality of primary application servers and in the event that a primary application server becomes unavailable, proxy 104 switches users to appropriate secondary application servers that have a copy of the user session state and can take over from the primary application server in an automatic and transparent manner from a user's perspective. In some embodiments, proxy 104 detects a failure in an application server (e.g., a primary application server 106 fails) and then to maintain user services and access by the system, proxy 104 switches user communications from connection 112 to 114. In some embodiments, if secondary application server 108 fails, proxy 104 switches user communications from connection 114 to 116 to another application server, represented by $N^{th}$ application server 110.

In the example shown in FIG. 1, primary application server 106 includes user session information and a cache. User session information includes components that describe the state of primary application server 106 with regard to an associated user. In some embodiments, the user session information comprises a Java object graph of components (objects) instantiated during the course of a user session, e.g., to provide application functionality invoked (explicitly or implicitly) by a user/client of an application running on an application server. The cache includes information regarding components that have been previously stored. In some embodiments, the user session information is sent to secondary application server 108 in order to enable, in the event of primary application server 106 becoming unavailable (e.g., crashing), the user to be switched over to secondary application server 108 without the user being made aware of the change. Serializing a component only if it has changed since a prior serialization is disclosed. In some embodiments, primary application server 108 transmits, or serializes, components to secondary application server 108 only if the component has changed since the last serialization. In some embodiments, if the component has not changed since the last serialization, primary application server 106 transmits a token, an indicator that a specific component has previously been transmitted and has not changed since last sent, to secondary application server 108. On the secondary application server 108, the token is received and understood to indicate that the previously serialized component should be used to provide system services and/or access to a user in the event that primary application server 106 is not able to provide system services and/or access to the user.

In the example shown in FIG. 1, secondary application server 108 includes user session information and a cache. User session information includes components that describe the state of primary application server 106 with regard to an associated user. The cache includes information regarding components that have been previously received. In some embodiments, the user session information is received from primary application server 106 in order to enable, in the event of primary application server 106 becoming unavailable (e.g., crashing), the user to be switched over to secondary application server 108 without the user being made aware of the change. In some embodiments, secondary application server 108 receives, or de-serializes, components from primary application server 106 only if the component has changed since the last serialization. In some embodiments, if the component has not changed since the last serialization, secondary application server 108 receives a token that identifies the component and indicates the component has not changed since the last serialization.

In the example shown in FIG. 1, a plurality of application servers (e.g., represented in FIG. 1 by $N^{th}$ application server 110) are available for taking over in the event of a failure of an application server. In some embodiments, more than one application server receives information describing the state of a user session so that there is more than one application server that can take over in the event that a primary application server fails. In some embodiments, each server has a designated secondary server that takes over in the event that it fails. A serialization stream is received by the secondary application server so that a copy of the user session is available to the secondary application server in the event that it takes over from the failed server.

Figure 2:
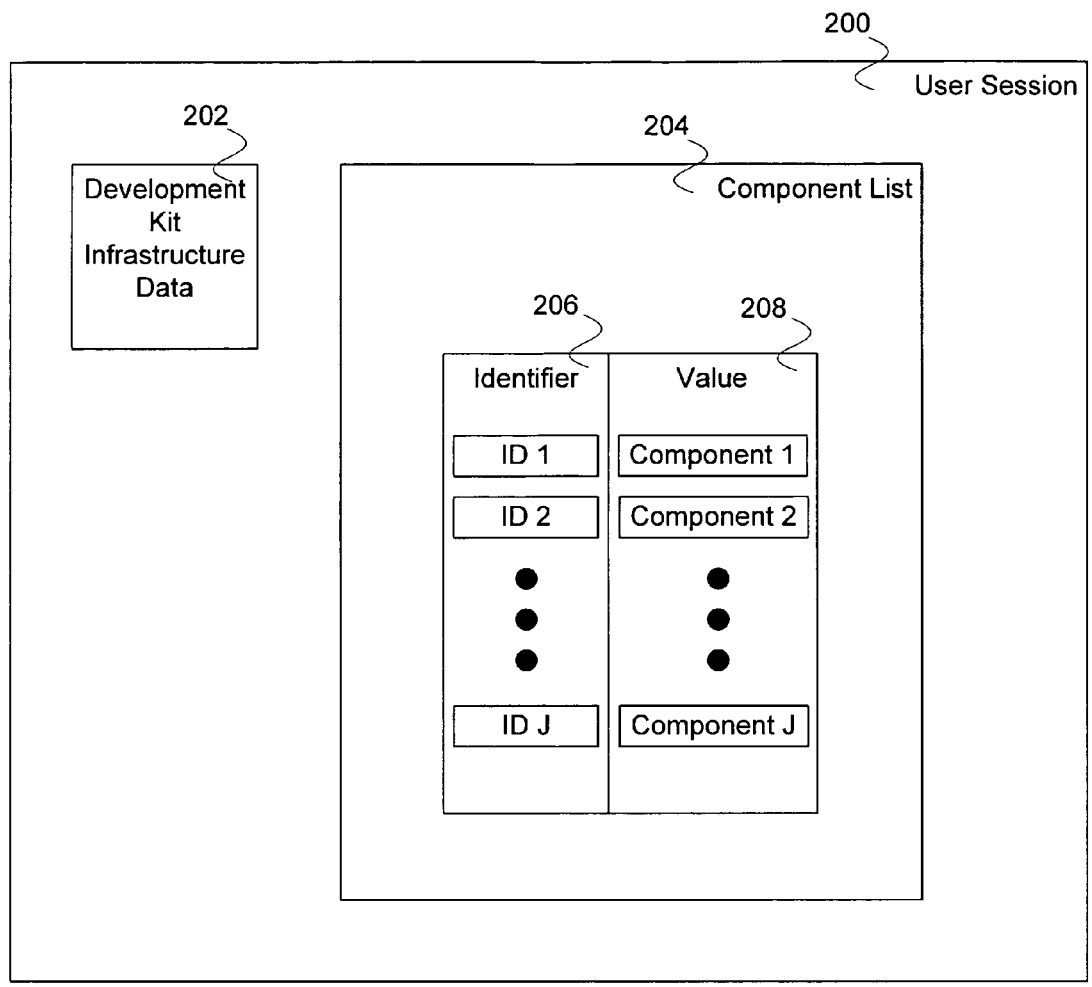
FIG. 2 is a block diagram illustrating an embodiment of user session information.

FIG. 2 is a block diagram illustrating an embodiment of user session information. In some embodiments, user session information of FIG. 2 is the information that is serialized in order to make a copy of the state of an application server. User session 200 includes development kit infrastructure data 202 and component list 204. In some embodiments, a component indicates navigation and/or functions executed by the user during a session. In some embodiments, a component can be any Java object. Component list 204 includes a list of identifiers, or keys—for example, identifier 206—and an array of components, and/or values—for example, value 208. In some embodiments, a component list is any object graph—for example, a list of objects connected/related to each other. In some embodiments, identifier 206 includes a list of identifiers, represented in FIG. 2 by ID 1, ID 2, and ID J, and value 208 includes a corresponding list of components, represented by component 1, component 2, and component J. In some embodiments, components comprise an array of components. In some embodiments, the array of components comprises an array of memory references listing for each component in the array a location in memory of a corresponding instance of the component.

Figure 3:
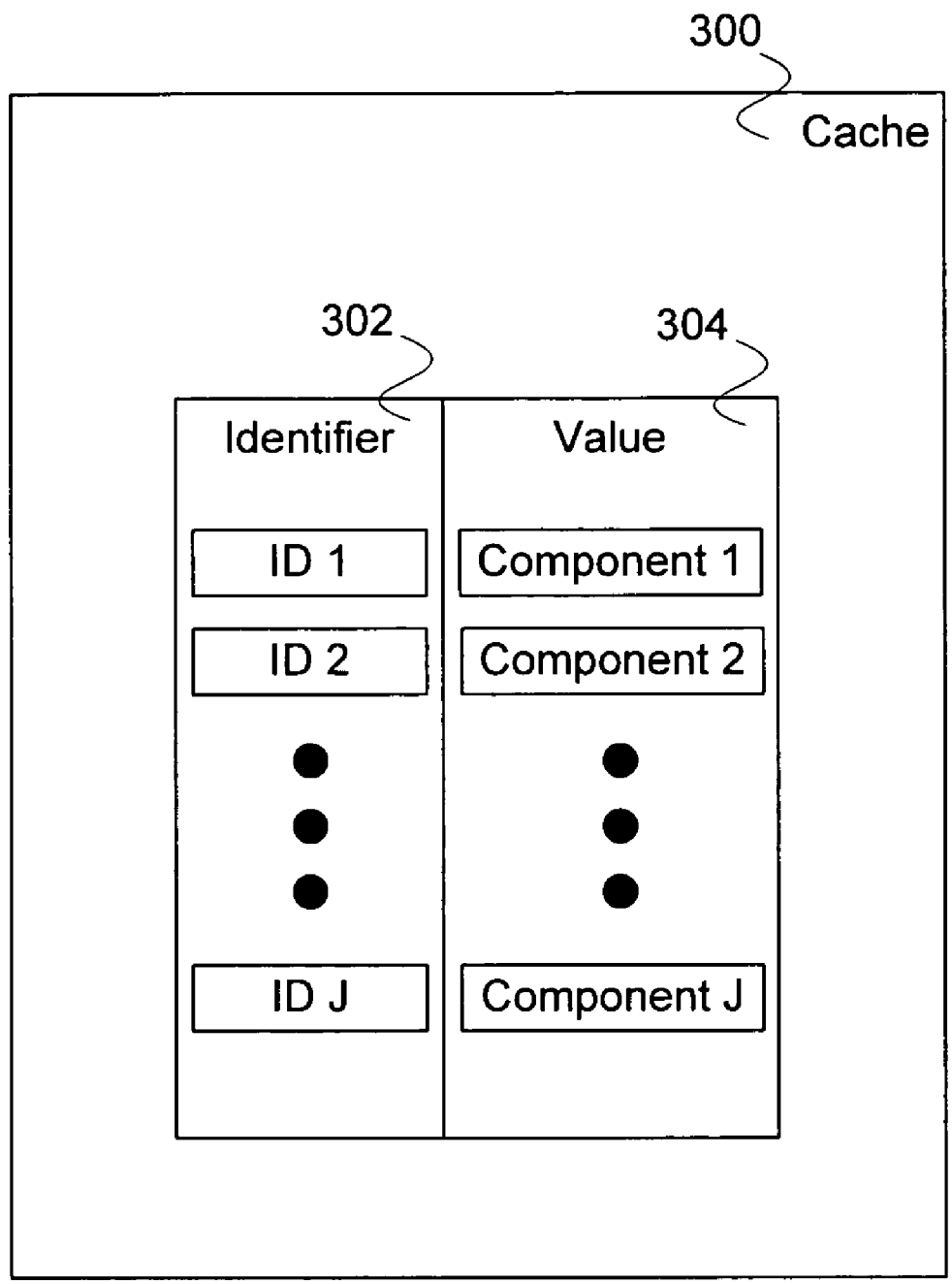
FIG. 3 is a block diagram illustrating an embodiment of a cache.

FIG. 3 is a block diagram illustrating an embodiment of a cache. In some embodiments, cache of FIG. 3 is used for storing components that have been previously transmitted during serialization. In the example shown, cache 300 includes a list of identifiers, or keys—for example, identifier 302—and an array of components, and values—for example, value 304. In some embodiments, identifier 302 includes a list of identifiers, represented in FIG. 3 by ID 1, ID 2, and ID J, and value 304 includes a corresponding list of components, represented by component 1, component 2, and component J. In some embodiments, components comprise an array of components. In some embodiments, the cache 300 resides on a secondary (or other standby) system and is used to track and/or store components receives via a serialization process from a primary system. In some embodiments, de-serialized components are stored in cache 300 at least in part to make them available to be used in a subsequent de-serialization, e.g., to reconstruct on the secondary or other standby system one or more user sessions on a primary system from which the components have been received (directly or indirectly), in place of serialization stream data if an indication is received that the component has not been changed on the primary system since a last (or other prior) serialization. In some embodiments, cache 300 comprises a global cache of components across user sessions. In some embodiments, a separate cache is maintained for each session.

Figure 4:
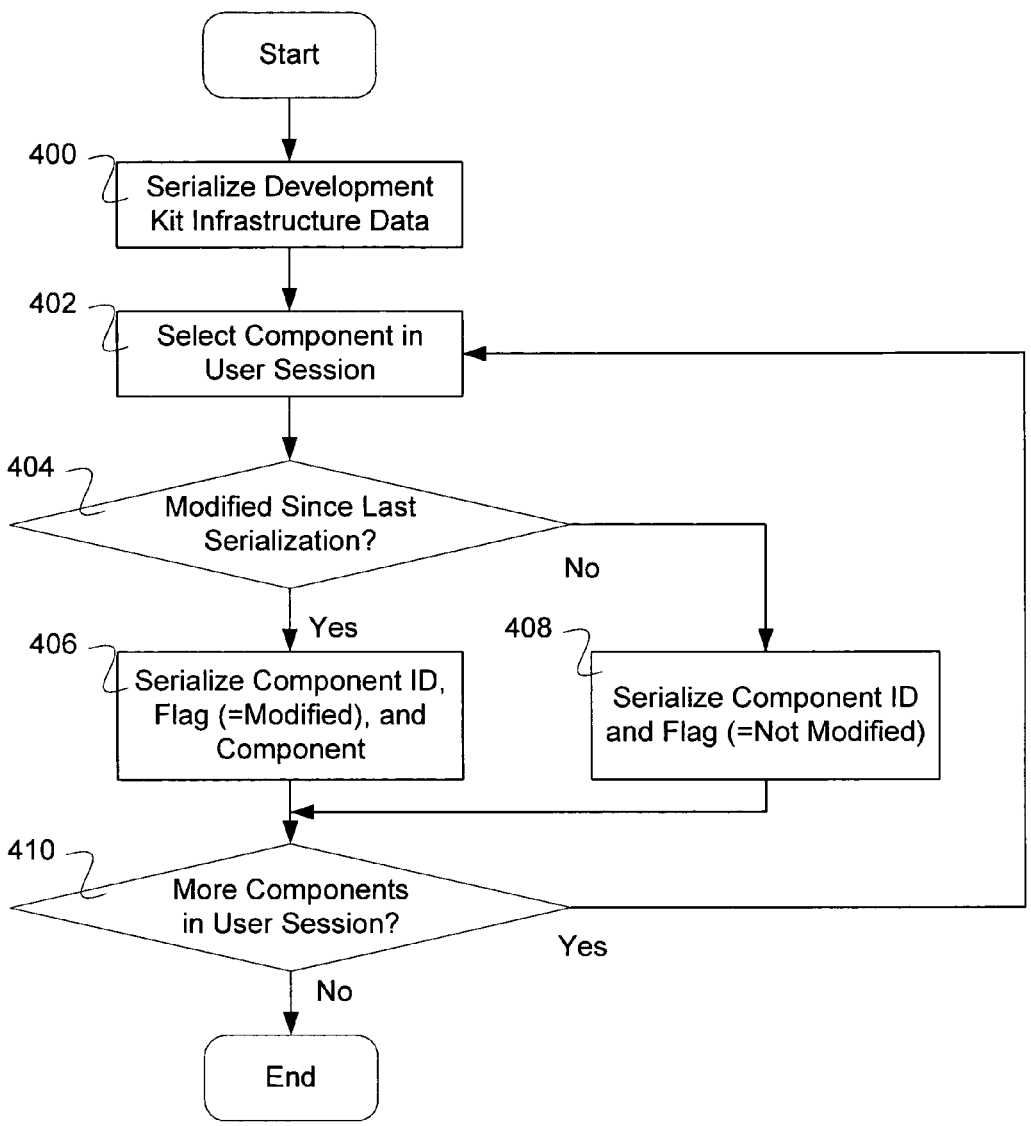
FIG. 4 is a flow diagram illustrating an embodiment of a serialization process.

FIG. 4 is a flow diagram illustrating an embodiment of a serialization process. In some embodiments, serialization is the process of transferring user session information from a primary system (e.g., an application server) to a secondary or other standby system to enable the user session to fail over to the secondary or other standby system in a manner that is transparent (or largely transparent) to the user if the primary system becomes unavailable. In some embodiments, the serialization includes only components that have not changed since the last serialization. In the example shown, in 400 development kit infrastructure data is serialized. In 402, a component in the user session is selected. In some embodiments, the selection of a component starts with a first component and a next component is selected by tracing component links or references from the first component. In some embodiments, if a component link identifies a component that has already been serialized, then the component is not serialized again during the current serialization. In 404, it is determined if a component has been modified since last serialization. In some embodiments, a flag indicates that a component has been modified since the last serialization. If the component has been modified, then in 406 the component ID, a flag that is in a state indicating that the component was modified, and the component are serialized. In some embodiments, once the component has been serialized, the flag indicating the component has been modified since last serialization is cleared. In some embodiments, the user session information (e.g., the component, component ID, and flag) are serialized using a java virtual machine (JVM). If the component has not been modified, then in 408, the component ID and a flag that is in a state indicating that the component was not modified are serialized, but the component itself is not serialized. In some embodiments, e.g., where the JVM is used, the native serialization process of the primary system/platform is configured to serialize all components comprising an object graph or none. In some embodiments, a "hook" or other indicator is configured to tell the native serialization process that a custom data is to be included in the serialization stream for an unchanged component, and for a component that has not changed custom logic causes a token indicating the component has not changed to be provided to the native serialization process as the data to be serialized for the unchanged component. In some embodiments, the JVM or other native serialization process would re-serialize all components (e.g., subcomponents) associated with a component to be serialized, e.g., a component that has changed in the approach illustrated in FIG. 4, regardless of whether the subcomponents had changed since a last serialization. In some embodiments, the process of FIG. 4 is applied recursively, such that if a subcomponent (e.g., object) of a changed component has not changed, a token or other data indicating the sub-component has not changed is serialized and the unchanged subcomponent is not serialized, even though the parent component and any subcomponents that have changed would be serialized. In 410, it is determined whether there are more components in the user session. If there are more components in the user session, then control is passed to 402. If there are no more components in the user session, then the process ends.

Figure 5:
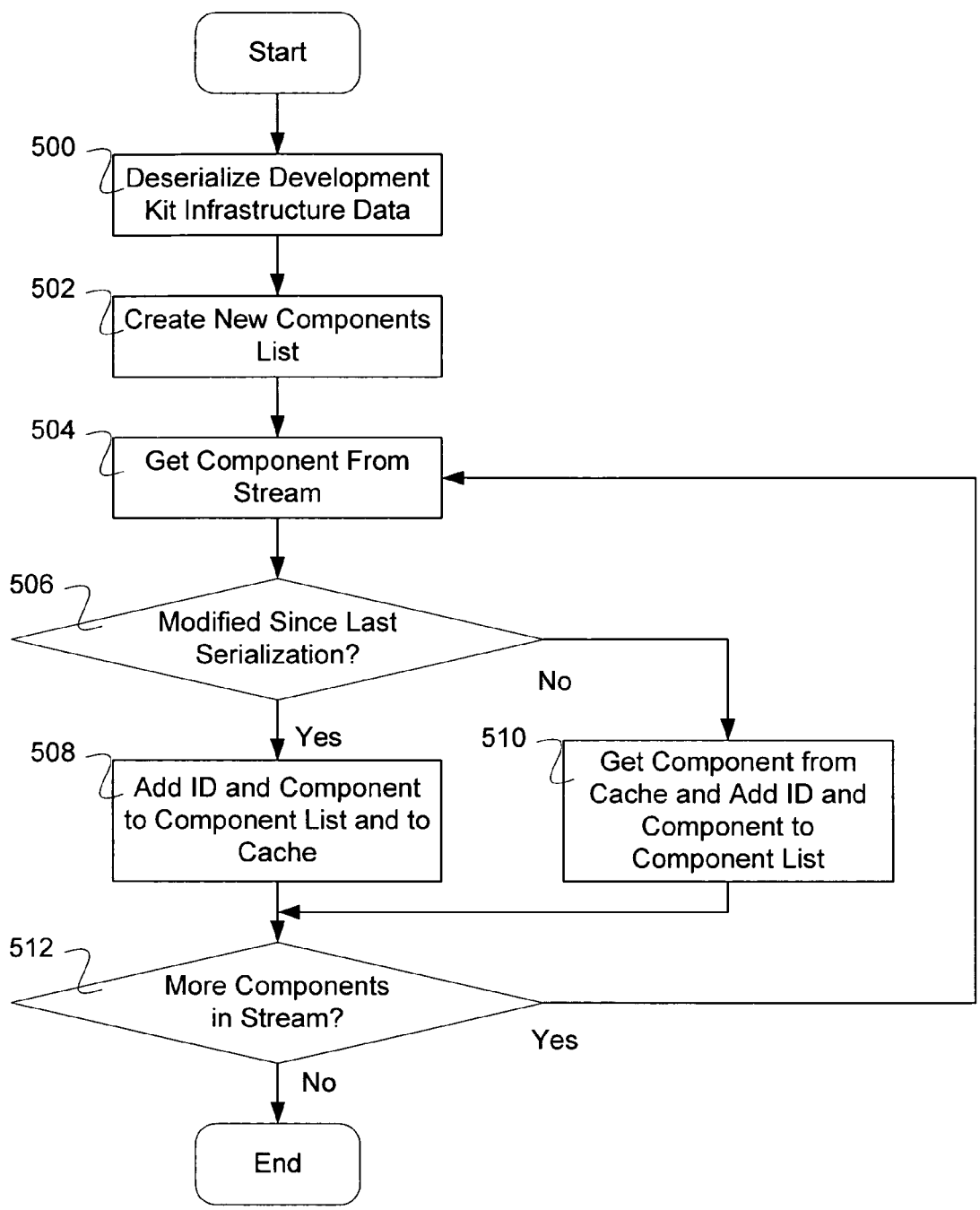
FIG. 5 is a flow diagram illustrating an embodiment of a process for de-serializing.

FIG. 5 is a flow diagram illustrating an embodiment of a process for de-serializing. In some embodiments, de-serialization is the process of receiving at a secondary or other standby system user session information from a primary system and using the user session information to maintain a shadow user session on the secondary/other standby system to enable the user session to fail over to the secondary/other standby system in a manner transparent (or largely transparent) to the user if the primary system becomes unavailable. In some embodiments, the serialization data stream includes only components that have not changed since the last serialization. If the serialization stream indicates a component has not changed since the last serialization, the component as received in the last (or other prior) serialization is retrieved from a cache. In the example shown, in 500 development kit infrastructure data is de-serialized. In 502, a new components list is created. In 504, a component is retrieved from stream. In 506, it is determined if the component has been modified since last serialization. If the component has been modified, then in 508 the component ID and the component to the component list and to a cache. In some embodiments, the cache is a global cache on the secondary application server. In some embodiments, the global cache enables the secondary server to serialize user session information from a primary application server. In some embodiments, the cache is a separate cache for each user. If the component has not been modified, then in 510, the component is retrieved from the cache and the component and the component ID is added to the component list. In 512, it is determined whether there are more components in the stream. If there are more components in the stream, then control is passed to 504. If there are no more components in the stream, then the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for serialization comprising:
    detecting if a component included in a list of components associated with a user session on a first system has not changed since a prior serialization to a second system, wherein the list of components comprises a list of a plurality of components previously serialized and an identifier associated with each of the plurality of components;
    indicating to a native serialization process to include a custom data in a serialization stream in place of a component that has not changed since the prior serialization;
    wherein a flag is configured to indicate a component included in the list of components has been modified since the prior serialization;
    wherein the flag is in a state indicating the component has been modified since the last serialization, sending to the second system during a current serialization, the changed component, and the custom data including a token indicating the component has not changed since the prior serialization and comprising at least the identifier associated with the component, wherein a serialization transfers state information of the user session from the first system to the second system enabling the second system to continue the user session in the event that the first system fails without the user being made aware of the changes;
    clearing the flag that indicates the component has been modified once the component has been serialized; and
    wherein in the event the list of components does not include any flags and/or tokens, the native serialization process would re-serialize any component regardless of whether the component has been modified since the prior serialization.

2. A method as in claim 1, wherein the token comprises a data value indicating the component has not changed.

3. A method as in claim 1, wherein the second system is configured to interpret the token as indicating the component has not changed and to use a cached copy of the component as received in the prior serialization to reconstruct the user session in connection with the current serialization.

4. A method as in claim 1, wherein the first system comprises a primary application server, the second system comprises a secondary application server, the user session comprises one or more components on the primary application server, and the prior serialization created a copy of the user session on a secondary application server.

5. A method as in claim 1, wherein detecting if a component has not changed since a prior serialization is based at least in part on checking a flag associated with the component.

6. A method as in claim 1, further comprising sending to the second system during the current serialization of a data associated with the user session.

7. A method as in claim 1, further comprising determining whether the component has been modified since the prior serialization.

8. A method as in claim 1, further comprising serializing the component in the event that the component has been modified since the prior serialization.

9. A method as in claim 8, wherein serializing the component comprises indicating that the component is to be included in a serialization stream.

10. A method as in claim 1, further comprising:
    detecting that the component has changed since a prior serialization to a second system, wherein the component comprises a first subcomponent and a second subcomponent, wherein the first subcomponent has changed since the prior serialization and the second subcomponent has not changed since the prior serialization; and sending to the second system during the current serialization a token indicating the second subcomponent has not changed since the prior serialization.

11. A system for serialization comprising:

a processor configured to:

detect if a component included in a list of components associated with a user session on a first system has not changed since a prior serialization to a second system, and wherein the list of components comprises a list of a plurality of components previously serialized and an identifier associated with each of the plurality of components;

indicate to a native serialization process to include a custom data included in a serialization stream in place of a component that has not changed since the prior serialization;

wherein a flag is configured to indicate a component included in the list of components has been modified since the prior serialization;

wherein the flag is in a state indicating the component has been modified since the last serialization, send to the second system during a current serialization, the changed component, and the custom data including a token indicating the component has not changed since the prior serialization and comprising at least the identifier associated with the component, wherein a serialization transfers state information of the user session from the first system to the second system enabling the second system to continue the user session in the event that the first system fails without the user being made aware of the changes;

clearing the flag that indicates the component has been modified once the component has been serialized;

wherein in the event the list of components does not include any flags and/or tokens, the native serialization process would re-serialize any component regardless of whether the component has been modified since the prior serialization; and a memory coupled with the processor and configured to provide the processor with instructions.

12. A system as in claim 11, wherein the token comprises a data value indicating the component has not changed.

13. A system as in claim 11, wherein the second system is configured to interpret the token as indicating the component has not changed and to use a cached copy of the component as received in the prior serialization to reconstruct the user session in connection with the current serialization.

14. A system as in claim 11, wherein the first system comprises a primary application server, the second system comprises a secondary application server, the user session comprises one or more components on the primary application server, and the prior serialization created a copy of the user session on a secondary application server.

15. A system as in claim 11, wherein detecting if a component has not changed since a prior serialization is based at least in part on checking a flag associated with the component.

16. A system as in claim 11, wherein the processor is further configured to send to the second system during the current serialization of a data associated with the user session.

17. A system as in claim 11, wherein the processor is further configured to determine whether the component has been modified since the prior serialization.

18. A system as in claim 11, wherein the processor is further configured to serialize the component in the event that the component has been modified since the prior serialization.

19. A system as in claim 18, wherein serializing the component comprises indicating that the component is to be included in a serialization stream.

20. A system as in claim 11, wherein the processor is further configured to:

detect that the component has changed since a prior serialization to a second system, wherein the component comprises a first subcomponent and a second subcomponent, wherein the first subcomponent has changed since the prior serialization and the second subcomponent has not changed since the prior serialization; and send to the second system during the current serialization a token indicating the second subcomponent has not changed since the prior serialization.

21. A computer program product for serialization, the computer program product being embodied in a non-transitory computer readable medium and comprising computer instructions for:

detecting if a component included in a list of components associated with a user session on a first system has not changed since a prior serialization to a second system, wherein the list of components comprises a list of a plurality of components previously serialized and an identifier associated with each of the plurality of components;

indicating to a native serialization process to include a custom data in a serialization stream in place of a component that has not changed since the prior serialization;

wherein a flag is configured to indicate a component included in the list of components has been modified since the prior serialization;

wherein the flag is in a state indicating the component has been modified since the last serialization, sending to the second system during a current serialization, the changed component, and the custom data including a token indicating the component has not changed since the prior serialization and comprising at least the identifier associated with the component, wherein a serialization transfers state information of the user session from the first system to the second system enabling the second system to continue the user session in the event that the first system fails without the user being made aware of the changes;

clearing the flag that indicates the component has been modified once the component has been serialized; and wherein in the event the list of components does not include any flags and/or tokens, the native serialization process would re-serialize any component regardless of whether the component has been modified since the prior serialization.

* * * * *